United States Patent
Nixon et al.

(10) Patent No.: US 6,433,097 B1
(45) Date of Patent: Aug. 13, 2002

(54) CURABLE POLYMER COMPOSITIONS AND THEIR PREPARATION

(75) Inventors: Steven Alistair Nixon, Newcastle-upon-Tyne; Sarah Anne Mackie Kelly, Gateshead, both of (GB)

(73) Assignee: International Coatings Limited (GB)

( * ) Notice: Subject to any disclaimer, the term of this patent is extended or adjusted under 35 U.S.C. 154(b) by 0 days.

(21) Appl. No.: 09/230,579

(22) PCT Filed: Jul. 28, 1997

(86) PCT No.: PCT/GB97/02033

§ 371 (c)(1),
(2), (4) Date: Jan. 27, 1999

(87) PCT Pub. No.: WO98/04594

PCT Pub. Date: Feb. 5, 1998

(30) Foreign Application Priority Data

Jul. 30, 1996 (GB) .............................................. 9616012

(51) Int. Cl.$^7$ .............................. C08L 8/30; C08L 75/06
(52) U.S. Cl. ...................... 525/273; 525/107; 525/124; 526/273; 526/307.7; 526/319; 427/340; 427/372.2; 427/385.5; 427/393.5
(58) Field of Search .............................. 526/273, 307.3, 526/319; 525/124, 123, 107; 427/340, 372.2, 385.5, 393.5

(56) References Cited

U.S. PATENT DOCUMENTS

| | | | |
|---|---|---|---|
| 3,247,143 A | 4/1966 | Masters et al. ................ 260/23 |
| 3,247,144 A | 4/1966 | Masters et al. ................ 260/23 |
| 3,247,145 A | 4/1966 | Masters et al. ................ 260/23 |
| 3,247,285 A | 4/1966 | Belanger ..................... 260/836 |
| 4,134,864 A | * | 1/1979 | Belanger ................. 260/17 EP |
| 4,176,212 A | * | 11/1979 | Brack et al. ................. 427/510 |
| 4,246,148 A | * | 1/1981 | Shimp et al. ........... 260/18 EP |
| 4,629,764 A | 12/1986 | Hefner, Jr. .................... 525/132 |
| 4,652,605 A | 3/1987 | Chang et al. ................. 525/10 |
| 4,872,960 A | * | 10/1989 | Keene et al. ............ 204/181.7 |
| 6,015,860 A | * | 1/2000 | Kuzumaki et al. .......... 525/123 |

FOREIGN PATENT DOCUMENTS

| | | |
|---|---|---|
| DE | 1 469 929 | 1/1969 |
| EP | 0 118 748 A1 | 9/1984 |
| EP | 0 433 711 A2 | 6/1991 |
| EP | 0 206 072 B1 | 9/1993 |

* cited by examiner

Primary Examiner—David W. Wu
Assistant Examiner—Tatyana Zalukaeva
(74) Attorney, Agent, or Firm—Gifford, Krass, Groh, Sprinkle, Anderson & Citkowski, P.C.

(57) ABSTRACT

A curable acrylic polymer composition useful in coating, sealant or adhesive compositions comprises an acrylic polymer containing pendant functional groups selected from epoxide groups, isocyanate groups, alkoxysilane groups and activated —CH— groups bonded to at least two electron-withdrawing groups and a curing agent which is reactive with the functional groups of the acrylic polymer and is characterized in that the polymer is dissolved in an organic compound of viscosity less than 2 Pas (20 poise) at 25° C. containing at least one functional group of the same functionality as that present in the acrylic polymer. The composition can be prepared by the free radical polymerization of a functional olefinically unsaturated monomer, and optionally one or more ethylenically unsaturated comonomers, in the presence of the said functional organic compound as diluent.

23 Claims, No Drawings

CURABLE POLYMER COMPOSITIONS AND THEIR PREPARATION

FIELD OF THE INVENTION

This invention relates to curable polymer compositions such as coating, sealant or adhesive compositions and to their preparation.

There has been increased concern in recent years about the release of volatile solvents into the atmosphere, and there has been a consequent need to reduce the volatile organic solvent content of coating, sealant and adhesive compositions. This has not been easy for coating compositions, which require a relatively low viscosity of about 0.2–1 Pas (2–10 poise) for application by the usual methods of spray, roller or brush, and particularly not for coating compositions which have to be applied and cure rapidly at ambient temperature, for example coatings for large structures such as ships, bridges, buildings, industrial plant and oil rigs. Coating compositions generally need to contain a polymer to confer film-forming properties, but any polymer needs to be of low molecular weight to give the required low viscosity, particularly after pigmentation as a paint. Preparation of low molecular weight acrylic polymers uses substantial quantities of polymerisation initiator and/or chain transfer agent and is highly exothermic, necessitating polymerisation in a solvent to control the exotherm. Preparation in a volatile organic solvent followed by stripping of the solvent is possible but is economically unattractive.

BACKGROUND ART

EP-A-206072 describes a semi-continuous process for preparing a polymeric reaction product which comprises the vinyl addition polymerisation of a vinyl monomer component selected from alkyl acrylates, alkyl methacrylates, monoalkenyl aromatic vinyl monomers, functional vinyl monomers and mixtures thereof at a temperature of at least 150° C. in the presence of a diluent selected from polyester polyols, carboxyl-functional polyesters, polyester urethane polyols, polyester polyepoxides and polyether polyols and having a molecular weight of at least 200, resulting in an ungelled product.

EP-A-433711 describes a terpolymer of a monovinylic aromatic monomer, an acrylic monomer and maleic anhydride formed according to a polymerisation method in which the maleic anhydride is added to the reactor in a molten state, free of solvents and diluents, and the polymerisation reaction is conducted in bulk in the absence of solvents and diluents.

U.S. Pat. No. 4,652,605 describes a process for preparing a polymeric reaction product which comprises the vinyl addition polymerisation of a vinyl monomer component, of which at least 50% by weight is an active hydrogen-containing vinyl monomer, in the presence of a polymeric diluent, which may for example be a polyester polyol.

U.S. Pat. No. 4,629,764 describes a polymer-modified epoxy resin composition which results from dehydrohalogenating the reaction product of an epihalohydrin with a composition which comprises a polyphenol and a copolymer of an alkenylphenol and a polymerisable ethylenically unsaturated monomer.

EP-A-118478 describes photocopolymerisable compositions comprising an epoxide comprising two or more groups such as 3,4-epoxycyclohexylmethyl 3,4-epoxycyclohexanecarboxylate and a cycloaliphatic epoxide such as vinylcyclohexane monoepoxide.

DISCLOSURE OF THE INVENTION

A process according to the present invention for the preparation of a curable polymer composition by the free radical polymerisation of a functional olefinically unsaturated monomer containing a functional group which is selected from epoxy groups, isocyanate groups, alkoxysilane groups, cyclic carboxylic anhydride groups and activated —CH— groups bonded to at least two electron-withdrawing groups and which is capable of reacting with a curing agent, and optionally one or more ethylenically unsaturated comonomers, is characterised in that the polymerisation is carried out in the presence of a reactive diluent which is a liquid organic compound of viscosity less than 2 Pas (20 poise) at 25° C. having at least one functional group which is substantially non-reactive with the functional olefinically unsaturated monomer and which is capable of reacting with a curing agent to form a polymer network. By "viscosity" we mean the high-shear viscosity as determined by an I.C.I. cone and plate viscometer.

The process of the invention can be used to prepare a curable addition polymer composition of viscosity less than 5 Pas (50 poise), for example of viscosity 0.1 to 0.2 Pas (1 to 2 poise) up to 3 or 4 Pas (30 or 40 poise). A polymer composition so prepared, when mixed with a curing agent which may be of lower viscosity, can form a coating composition having a viscosity up to 1 Pas (10 poise), for example 0.2 to 0.6 Pas (2 to 6 poise), so that it can be applied to a substrate by conventional spray, roller or brush, without dilution by a volatile organic solvent. The use of volatile solvent can thereby be avoided both during preparation of the curable addition polymer and during application of a coating or sealant or adhesive, or the amount of volatile solvent can be reduced to a very low level such as less than 20% or even less than 10% by weight of the composition. If a low level of non-reactive volatile solvent is present during the polymerisation it may either be retained in the coating composition or be stripped from the composition after polymerisation is completed.

The functional group of the reactive diluent is preferably capable of reacting with the same curing agent with which the functional group of the olefinically unsaturated monomer reacts, so that the curable addition polymer and the reactive diluent can be linked by the curing agent in the same polymer network. Most preferably, the functional group of the reactive diluent has the same functionality as the functional monomer. The reactive diluent should be substantially non-reactive both with the functional group of the monomer and with the olefinic double bond of the monomer and therefore should not contain a polymerisable olefinic double bond.

The functional olefinically unsaturated monomer is preferably an acrylic monomer, particularly an acrylic ester, such as an acrylate or methacrylate, substituted by a reactive functional group.

In most cases, at least some of the reactive diluent preferably contains at least two of the said functional groups, although reactive diluents having one functional group can be used, particularly when the curing agent has functionality greater than 2. All of the reactive diluent may be of functionality 2 or more, or the reactive diluent may comprise a mixture of a monofunctional compound with one or more compounds of higher functionality.

The invention includes a curable acrylic polymer composition comprising an acrylic polymer of number average molecular weight Mn (determined by gas permeation chromatography (GPC)) less than 5000 containing pendant functional groups selected from epoxide groups, isocyanate groups, alkoxysilane groups, cyclic carboxylic anhydride groups and activated —CH— groups bonded to at least two electron-withdrawing groups, the polymer being dissolved in an organic compound of viscosity less than 2 Pas (20 poise) at 25° C. containing at least two functional groups of the same functionality as that present in the acrylic polymer, and a curing agent which is reactive with the functional groups of the acrylic polymer and with the functional groups of the organic compound.

The invention is particularly useful in preparing curable acrylic polymer compositions which are epoxide-functional, that is which comprise an epoxide-functional acrylic polymer (formed from a corresponding monomer)in a reactive diluent containing at least one epoxide group. An epoxide-functional acrylic monomer can for example be glycidyl acrylate or methacrylate.

Examples of ethylenically unsaturated comonomers which can be copolymerised with such a functional acrylic monomer are acrylic esters such as butyl acrylate or methacrylate, methyl methacrylate or acrylate, ethyl acrylate or methacrylate, propyl acrylate or methacrylate, n-hexyl acrylate or methacrylate, isopropyl acrylate or methacrylate, t-butyl acrylate or methacrylate, 2-ethylhexyl methacrylate or acrylate, cyclohexyl acrylate or methacrylate, 2,2,5-trimethylcyclohexyl acrylate or methacrylate, isobornyl acrylate or methacrylate, acrylonitrile, methacrylonitrile and vinyl compounds such as styrene, vinyl acetate or vinyl chloride.

The functional olefinically unsaturated monomer can alternatively be a vinyl or allyl monomer, for example the epoxide-functional monomer can be allyl glycidyl ether or vinyl-3,4-epoxycyclohexane. The monomers copolymerised with such a functional vinyl monomer can in general be any of those listed above, although vinyl monomers such as vinyl chloride and vinyl acetate may be preferred since acrylic monomers generally polymerise more readily and rapidly. If acrylic comonomers are used with a functional vinyl monomer care should be taken, for example by order of addition of monomers, to ensure that the functional vinyl monomer has been incorporated into the copolymer.

One preferred type of reactive diluent is a cyclic organic compound containing two alkyl groups each substituted by the functional group present in the functional acrylic or other olefinically unsaturated monomer. An epoxide-functional reactive diluent may for example be a cyclic compound substituted by at least two glycidyl groups. Examples of such compounds having the required viscosity include cyclohexanedimethanol diglycidyl ether, diglycidyl phthalate, diglycidyl cyclohexanedicarboxylate or resorcinol diglycidyl ether. Alternative epoxide-functional reactive diluents, preferably containing at least two glycidyl ether groups, which can be used in place of or together with the above include butanediol diglycidyl ether, pentaerythritol polyglycidyl ether, butyl glycidyl ether, octa-1,7-diene diepoxide, vinyl cyclohexene diepoxide and/or 3,4-epoxycyclohexylmethyl 3,4-epoxycyclohexanecarboxylate.

The functional acrylic monomer and the ethylenically unsaturated comonomer(s), if used, are polymerised by addition polymerisation while in solution. The polymerisation is preferably carried out in the substantial absence of non-functional volatile solvent, that is solvent which will not react with the curing agent for the polymer. Alternatively, a small proportion, for example up to 10 to 20% by weight of the polymerisation reaction mixture, of a non-functional volatile solvent which is miscible with the reactive diluent can be present containing at least one isocyanate or cyclic carbonate group. Some or all of the monomers can be pre-dissolved in the reactive diluent but preferably the monomers, together with the free radical initiator(s) and any chain transfer agent used, are gradually added to the diluent. For example, the reactive diluent can be heated to a temperature in the range 50–200° C., particularly 100–160° C., and the monomers, initiator and chain transfer agent are added over a period of up to 4 hours while maintaining the temperature of the solution during addition and for a further period of 0.5–4 hours after addition. A further charge of initiator may be added during this further period to reduce the level of unreacted monomer. The free radical initiator can for example be a peroxide or peroxy-ester such as benzoyl peroxide or tertiary butyl peractoate or an azo compound such as azobisisobutyronitrile or azo-bis(2-methylbutyronitrile).

A chain-transfer agent, for example dodecanethiol, butanethiol, pentaerythritol tetra(mercaptopropionate) or dibutyl phosphite, may be present during polymerisation. The level of initiator and of chain-transfer agent, if present, are preferably controlled so that the number average molecular weight Mn of the polymer produced is no more than 10000 and is preferably in the range 600 to 5000, most preferably 1000 to 3000. For example, the amount of free radical initiator used (by weight based on monomers) is generally at least 1%, preferably 2 to 10%, when no chain transfer agent is used, or a level of 1 to 5% initiator can be used in conjunction with 1 to 10% chain transfer agent.

The curing agent which is present in the curable acrylic polymer composition can in general be any curing agent active in crosslinking the functional groups present in the acrylic polymer and in the reactive diluent under the intended conditions of curing. The curing agent for an epoxide-functional acrylic polymer composition can for example be thiol-functional or amino-functional. Most preferably, the curing agent is a liquid polythiol of viscosity less than 2 Pas (20 poise) at 25° C. Examples of such thiol-functional curing agents are pentaerythritol tetra (mercaptopropionate), trimethylolpropane tris(mercapto propionate) or a thiol-tipped low molecular weight polyether. Alternatively, the curing agent can be a liquid polyamine such as an aliphatic or aryl aliphatic diamine.

Alternative functional monomers are those which contain an activated —CH— group bonded to at least two electron-withdrawing groups, for example carbonyl, carboxyl, nitrile, nitro, phosphonate or phosphate ester groups. The activated —CH— group can for example be an acetoacetate group, a malonate ester group, a 1,3-diketone or a cyanoacetate group. A functional acrylic monomer can for example be an acetoacetatoalkyl methacrylate. Such an activated —CH— group-containing monomer can be polymerised with an ethylenically unsaturated comonomer of the type described above. The reactive diluent to be used for the polymerisation generally contains at least one similarly activated —CH— group, for example an acetoacetate, malonate, 1,3-diketone or cyanoacetate group. It can for example be an acetoacetate ester, preferably an alkyl acetoacetate such as ethyl acetoacetate, an acetoacetate ester of a polyol containing two or more acetoacetate groups such as ethylene glycol bis (acetoacetate) or 1,6-hexanediol bis(acetoacetate), acetylacetone or a dialkyl malonate such as diethyl malonate. The polymerisation conditions are generally as described above for epoxide-functional monomers.

The curing agent for an acrylic polymer composition having activated —CH— functionality is generally a material having at least two activated olefinic double bonds, that is having a carboxyl, carbonyl or cyano group adjacent to the double bond. Curing takes place by Michael addition between the activated —CH— group and the activated double bond. Preferred curing agents are those containing alpha, beta-unsaturated carboxylic groups such as acrylates. The curing agent for an activated —CH— functional composition can for example be a polyacrylate ester of a polyol such as trimethylolpropane triacrylate, trimethylolethane triacrylate, ethylene glycol diacrylate, 1,6-hexanediol diacrylate or pentaerythritol triacrylate or tetraacrylate, or an acrylate-tipped oligomer such as a urethane acrylate, melamine acrylate, polyester acrylate, epoxy acrylate or silicone acrylate.

An alternative curing agent for an activated —CH— functionality is a polyamine containing at least two, preferably at least three, primary or secondary amine groups.

The curing reaction between an activated —CH— group-functional polymer composition and a polyacrylate or a polyamine generally gives adequate cross-linking to form a hard solvent-resistant and weather-resistant coating even when the reactive diluent contains only one —CH— group, particularly when the curing agent contains at least three amine groups or activated double bonds such as trimethylolpropane triacrylate. The invention thus includes a curable acrylic polymer composition comprising an acrylic polymer of number average molecular weight less than 5000 having pendant groups each containing an activated —CH— group bonded to at least two electron-withdrawing groups, dissolved in a reactive diluent which is a liquid organic compound of viscosity less than 2 Pas (20 poise) at 25° C. containing at least one activated —CH— group bonded to at least two electron-withdrawing groups, and a curing agent which contains at least two activated C=C double bonds per molecule, said C=C bonds being activated by at least one vicinal electron-withdrawing group, or which contains at least two primary or secondary amine groups.

The invention includes a curable acrylic polymer composition comprising an acrylic polymer of number average molecular weight less than 5000 containing pendant epoxide functional groups, and a curing agent which is reactive with the epoxide groups of the acrylic polymer, the polymer being dissolved in an organic compound of viscosity less than 2 Pas (20 poise) at 25° C. containing at least one epoxide functional group. The composition having a viscosity of 0.1 to 2 Pas (1 to 20 poise) at 25° C.

Another type of functional monomer which can be polymerised is an isocyanate-functional monomer such as isocyanatoethyl acrylate or methacrylate. This can be polymerised in a reactive diluent containing at least one, preferably at least two, isocyanate groups, such as toluene diisocyanate, hexamethylene diisocyanate, cyclohexylene diisocyanate or isophorone diisocyanate.

The curing agent for an isocyanate-functional acrylic polymer composition is an active hydrogen compound, for example a compound having at least two groups selected from hydroxyl and amino groups such as butanediol, trimethylolpropane and/or 2,4-diethyl-6-methyl-benzene-1,3-diamine.

Amines also undergo a crosslinking reaction with cyclic carbonates. A liquid cyclic carbonate such as propylene carbonate is a non-reactive solvent for isocyanate-functional monomers and polymers and can be used as the solvent for the polymerisation of a monomer such as isocyanatoethyl methacrylate. The resulting composition can be cured by a polyamine which will react both with the isocyanate functionality of the acrylic polymer and with the propylene carbonate reactive diluent.

Another type of functional ethylenically unsaturated monomer which can be polymerised is an alkoxysilane-functional monomer such as 3-(trimethoxysilyl)-propyl acrylate or methacrylate or allyl triethoxy silane. This can be polymerised in a reactive diluent containing at least one, preferably at least two, alkoxy groups attached to silicon, such as phenyl methyl dimethoxy silane or methyl trimethoxy silane. The alkoxy groups attached to silicon are curable by moisture, so that care should preferably be taken to exclude moisture during the polymerisation and subsequent storage. The resulting polymer composition can be used as a single-pack moisture-curing coating composition.

Another type of functional ethylenically unsaturated monomer which can be polymerised is a cyclic carboxylic anhydride-functional monomer such as itaconic anhydride or maleic anhydride. This can be polymerised in a reactive diluent containing at least one, preferably at least two, cyclic carboxylic anhydride groups such as an adduct of a dithol and maleic anhydride having the formula:

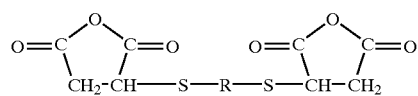

where R is a divalent organic radical, for example an alkylene group such as hexamethylene or a divalent thioether or polythioether radical. The resulting polymer composition can be cured with a compound or polymer containing at least two secondary amine groups, preferably hindered secondary amine groups, such as an adduct of a primary polyamine, for example an amine-tipped polyether, and an acrylate ester as described in U.S. Pat. No. 5,304,607. The polymer composition containing anhydride groups can alternatively be cured by a composition containing hydroxyl groups and catalytic tertiary amine groups.

The liquid reactive diluent in which the polymerisation is carried out can be modified before the resulting acrylic polymer composition is contacted with a curing agent, for example it can be reacted with a compound which increases the molecular weight and/or the functionality of the reactive diluent. The polymerisation can for example be carried out in the presence of a liquid organic compound (A) having a functional group ($A^1$), which is non-reactive with the functional olefinically unsaturated monomer and which is capable of reacting with a curing agent to form a polymer network, and a liquid organic compound (B) of functionality at least two which is non-reactive with the functional olefinically unsaturated monomer but which is reactive with the compound (A) to form a liquid organic compound (C) having at least two functional groups ($A^1$). The compounds (A), (B) and (C) preferably all have a viscosity less than 2 Pas (20 poise) at 25° C. This procedure can be convenient if it is desired to use a reactive diluent having two or more functional groups which is not readily available commercially. The reaction of (A) and (B) to form (C) may take place during the addition polymerisation or as a subsequent step carried out at a higher temperature or using a subsequently added catalyst. The compound (A) can for example be an ester of a volatile alcohol which is removed from the reaction vessel during the reaction, with (B) being a less volatile alcohol. An acetoacetate-functional acrylic polymer can for example be prepared in a diluent comprising an acetoacetate of a volatile alcohol such as t-butyl acetoacetate and a non-volatile diol such as cyclohexanedimethanol. After the polymerisation step, a transesterification catalyst can be added and the volatile alcohol (e.g. t-butanol) distilled off, leaving a solution of the polymer in the reactive diluent bis(acetoacetoxymethyl) cyclohexane.

If the curable acrylic polymer composition is intended to be cured at ambient temperature, it will generally be preferred that the curable acrylic polymer and reactive diluent are packaged separately from the curing agent and are mixed with it shortly before use. In the case of ambient curing coatings they can for example be mixed for up to 8 hours, usually up to 2 hours, before application to a substrate or during application, for example in a twin-feed spray.

The coating, sealant or adhesive composition may contain additional ingredients. For example, a coating composition will generally contain one or more pigments, for example anticorrosive pigments such as zinc phosphate or sodium zinc molybdate, or colouring and opacifying pigments such as titania, iron oxide or phthalocyanine pigments. A sealant composition will also generally contain pigments and/or fillers such as calcium carbonate or talc, and all types of composition may contain additives such as plasticisers, thixotropes such as silica gel or bentonite clay, or stabilising agents.

The invention is illustrated by the following Examples:

EXAMPLE 1

| Formulation | Weight in grams |
| --- | --- |
| 3,4-Epoxycyclohexylmethyl 3,4-Epoxycyclohexane carboxylate | 250 |
| Methyl Methacrylate | 48.1 |
| Butyl Acrylate | 252.4 |
| Glycidyl Methacrylate | 144.2 |
| Dodecanethiol (chain transfer agent) | 38.9 |
| 3,4-Epoxycyclohexylmethyl 3,4-Epoxycyclohexane carboxylate | 50 |
| t-Butyl Peroctoate (initiator) | 17.6 |

Procedure 250 g 3,4-epoxycyclohexylmethyl 3,4-epoxycyclohexane carboxylate was charged to a vessel fitted with condenser, $N_2$ purge, stirrer, thermometer and addition port and was heated to 150° C. under $N_2$. The monomers and dodecanethiol and the initiator in 50 g 3,4-epoxycyclohexyl 3,4-epoxycyclohexanecarboxylate were separately charged to the heated vessel over 2 hours and held at 150° C. for 1 hour more. An initiator boost of 1 g was added and the vessel was held at 150° C. for a further hour.

The resulting polymer composition had a viscosity of 2.62 Pas (26.2 poise) as measured by cone and plate viscometer at 25° C., a measured epoxy equivalent weight of 245 and a measured non-volatile content (1 hour at 150° C.) of 94.9% by weight. The number average molecular weight Mñ was 1266 and the weight average molecular weight Mw was 2280, as measured by GPC.

The stripped composition was mixed with a stoichiometric equivalent amount of pentaerythritol tetramercaptopropionate, which reduced the viscosity to below 1 Pas (10 poise), and was sprayed on a steel panel and allowed to cure to a clear tough coating at ambient temperature.

EXAMPLE 2

| Formulation | % by Weight |
| --- | --- |
| 1. Ethyl Acetoacetate | 26.13 |
| 2. Styrene | 26.17 |
| 3. Acetoacetoxyethyl Methacrylate | 32.35 |
| 4. Methyl Methacrylate | 7.21 |
| 5. 2,2¹-Azobis-(2-methylbutyronitrile) (initiator) | 1.41 |
| 6. 2-Mercaptoethanol | 2.78 |
| 7. Initiator | 0.08 |
| 8. Ethyl Acetoacetate | 3.87 |

1 was charged to a reaction vessel and heated to 100° C. 2, 3, 4, 5, 6 were mixed together and added to 1 in the reaction vessel over 4 hours, maintaining the temperature of 100° C., and were held at 100° C. for 30 minutes more. 7 and 8 were mixed and added to the reaction vessel, which was held for a further 1 hour at 100° C. The polymer solution produced had viscosity 1.5 Pas (15 poise), Mñ 1800 and Mw 3100 relative to polystyrene by GPC.

100 g of polymer solution was mixed with 57.2 g of trimethylolpropane triacrylate and 1.26 g of diazabicycloundecene catalyst (as a 10% w/w solution in methoxypropyl acetate). The resulting composition was sprayed as a coating and allowed to cure to give a film with hardness 80 Konig swings after 7 days' cure at ambient temperature.

EXAMPLE 3

| Formulation | Weight in grams |
| --- | --- |
| Cyclohexanedimethanol Diglycidyl Ether | 1000.0 |
| Butyl Acrylate | 1009.6 |
| Glycidyl Methacrylate | 849.2 |
| Dodecanethiol | 311.2 |
| Cyclohexanedimethanol Diglycidyl Ether | 300.0 |
| t-Butyl Peroctoate | 70.4 |
| | 3444.4 |

The above formulation was polymerised using the procedure of Example 1 to form a polymer solution of viscosity 0.6 Pas (6 poise), non-volatile content 90.5% and epoxy equivalent weight 263.

A coating composition was prepared using the same curing agent as in Example 1 and had viscosity 0.54 Pas (5.4 poise). It was sprayed and cured at ambient temperature and was dry to handle after 1.5 hours. When cured at 5° C. the coating was dry to handle within 18 hours.

EXAMPLE 4

| Formulation | Weight in grams |
| --- | --- |
| Cyclohexanedimethanol Diglycidyl Ether | 150.0 |
| Glycidyl Methacrylate | 262.6 |
| Dodecanethiol | 37.4 |
| Cyclohexanedimethanol Diglycidyl Ether | 50.0 |
| t-Butyl Peroctoate | 7.9 |

The above formulation was polymerised using the procedure of Example 1 to form a polymer solution of viscosity 2.45 Pas (24.5 poise), non-volatile content 91.1% and epoxy equivalent weight 168.5.

When mixed with a stoichiometric amount of the curing agent of Example 1, a sprayable coating composition was formed.

EXAMPLE 5

| Formulation | Weight in grams |
|---|---|
| Cyclohexanedimethanol Diglycidyl Ether | 156 |
| Butyl Acrylate | 157 |
| Glycidyl Methacrylate | 132 |
| Dibutyl Phosphite | 28 |
| Cyclohexanedimethanol Diglycidyl Ether | 31 |
| t-Butyl Peroctoate | 11 |

The above formulation was polymerised using the procedure of Example 1 to form a polymer solution of viscosity 2.8 Pas (28 poise), non-volatile content 91.8% and epoxy equivalent weight 244.5.

A paint base was prepared by milling the following in a high speed disperser to below 40 microns

| | |
|---|---|
| Polymer solution prepared above | 300 g |
| Structuring agents (modified clays) | 30 g |
| Titanium Dioxide | 931 g | and diluting the milled product with a further 771 g of the polymer solution.

1940 g of the resulting paint base was mixed with 5.2 g acrylic polymer flow aid, 572 g pentaerythritol tetra (mercaptopropionate) and 48.5 g dimethyl 1010 amine as an auxiliary curing agent to form a white paint of pot life over 30 minutes. The paint was sprayed on steel panels at a film thickness of 200 microns and was allowed to cure at ambient temperature (about 25° C.). The paint film was through dry (hard enough to handle) after 2 hours.

EXAMPLE 6

| Formulation | Weight in grams |
|---|---|
| Phenylmethyldimethoxysilane | 190.0 |
| Butyl Acrylate | 246.5 |
| 3-(Trimethoxysilyl)-propyl Methacrylate | 85.0 |
| 3-Mercapto-propyl Trimethoxysilane | 28.5 |
| Phenylmethyldimethoxysilane | 50.0 |
| Azo-bis (2-methyl-butyronitrile) | 13.1 |
| | 613.1 |

The above formulation was polymerised using the procedure of Example 2 to form a polymer solution suitable for use as a coating composition.

The polymer solution was sprayed on a steel panel and allowed to cure by moisture under atmospheric conditions to form a clear hard coating.

EXAMPLE 7

| Formulation | Wt (g) | Moles |
|---|---|---|
| Cyclohexane Dimethanol | 22.9 | 0.159 |
| t-Butyl Acetoacetate | 75.2 | 0.476 |
| Butyl Acrylate | 147.5 | 1.152 |
| Acetoacetoxyethyl Methacrylate | 82.2 | 0.388 |
| Dodecanethiol | 15.5 | 0.077 |
| t-Butyl Peroctoate } initiators | 7.1 | 0.037 |
| t-Butyl Acetoacetate} | 40.0 | 0.253 |

Procedure

Cyclohexanedimethanol and t-Butyl acetoacetate were charged to a flask and raised to reflux under a nitrogen atmosphere. Monomers, dodecanethiol and most of the initiators were fed into the reaction medium over two hours, maintaining at reflux. Once feeding was complete, the reaction was maintained at reflux for a further two hours. A further portion of initiators was charged after one hour, to consume all monomer.

Dibutyltin dilaurate transesterification catalyst was added and t-butanol was distilled off. The reaction mixture was cooled when the expected volume of t-butanol (23.5 ml) had been collected.

The product was a mobile liquid with a viscosity of 0.63 Pas (6.3 poise), comprising a solution of a butyl acrylate acetoacetoxyethyl methacrylate copolymer in bis (acetoacetoxymethyl) cyclohexane as reactive diluent.

When mixed with a stoichiometric amount of the curing agent of Example 2, a sprayable coating composition was formed which cured at ambient temperature to a hard film.

What is claimed is:

1. A process for the preparation of a curable polymer composition comprising free radical polymerisation of a functional olefinically unsaturated monomer comprising a functional group which is selected from isocyanate groups, alkoxysilane groups, and activated —CH— groups bonded to at least two electron-withdrawing groups, wherein the activated —CH— groups are selected from the group consisting of: an acrylic group, an acetoacetate group, a malonate ester group, a 1,3-diketone and a cyanoacetate group and which is capable of reacting with a curing agent, in which process the polymerisation is carried out in the presence of a reactive diluent which is a liquid organic compound of viscosity less than 2 Pa.s (20 poise) at 25° C. having at least two functional groups which are substantially non-reactive with the functional olefinically unsaturated monomer and which are capable of reacting with the said curing agent so that the curable polymer and the reactive diluent are linked by the curing agent in the same polymer network.

2. A process according to claim 1, wherein the functional olefinically unsaturated monomer is an acrylic ester substituted by a reactive functional group.

3. A process according to claim 1, wherein the functional group of the reactive diluent has the same functionality as the functional olefinically unsaturated monomer.

4. A process according to claim 1, the polymerisation is carried out in the presence of a liquid organic compound (A) having a functional group ($A^1$) which is non-reactive with the functional olefinically unsaturated monomer and which is capable of reacting with a curing agent to form a polymer network and in the presence of a liquid organic compound (B) of functionality at least two, which is non-reactive with the functional olefinically unsaturated monomer but which is reactive with the compound (A) to form a liquid organic compound (C) having at least two functional groups (A¹), the compounds, (A), (B) and (C) all having a viscosity less than 2 Pa.s (20 poise) at 25° C.

5. A process according to claim 3, wherein the functional monomer is an acetoacetatoalkyl methacrylate and the reactive diluent is an acetoacetate ester.

6. A process according to claim 1, wherein the functional monomer is an isocyanate-functional monomer and the reactive diluent contains at least one isocyanate or cyclic carbonate group.

7. A process according to claim 1, wherein the polymerisation is carried out in the substantial absence of non-functional volatile solvent.

8. A curable addition polymer coating composition of viscosity 0.1 to 1 P.as (1 to 10 poise), wherein said composition has been prepared by the free radical polymerisation of a functional olefinically unsaturated monomer comprising a functional group which is selected from isocyanate groups, alkoxysilane groups, and activated —CH— groups bonded to at least two electron-withdrawing groups, wherein the activated —CH— groups are selected from the group consisting of: an acrylic group, an acetoacetate group, a malonate ester group, a 1,3-diketone and a cyanoacetate group and which is capable of reacting with a curing agent, the polymerisation being carried out in the presence of a reactive diluent which is a liquid organic compound of viscosity less than 2 Pa.s (20 poise) at 25° C. having at least two functional groups which are substantially non-reactive with the functional olefinically unsaturated monomer and which are capable of reacting with the said curing agent so that the curable polymer and the reactive diluent are linked by the curing agent in the same polymer network.

9. A process for coating a substrate with a curable addition polymer composition, wherein a curable composition is applied to the substrate without dilution by a volatile organic solvent, the curable composition being a curable addition polymer coating composition of viscosity 0.1 to 1 P.as (1 to 10 poise), wherein said composition has been prepared by the free radical polymerisation of a functional olefinically unsaturated monomer comprising a functional group which is selected from isocyanate groups, alkoxysilane groups, and activated —CH— groups bonded to at least two electron-withdrawing groups, wherein the activated —CH— groups are selected from the group consisting of: an acrylic group, an acetoacetate group, a malonate ester group, a 1,3-diketone and a cyanoacetate group and which is capable of reacting with a curing agent, the polymerisation being carried out in the presence of a reactive diluent which is a liquid organic compound of viscosity less than 2 Pa.s (20 poise) at 25° C. having at least two functional groups which are substantially non-reactive with the functional olefinically unsaturated monomer and which is capable of reacting with the said curing agent at ambient temperature so that the curable polymer and the reactive diluent are linked by the curing agent in the same polymer network.

10. A curable acrylic polymer composition comprising an acrylic polymer of number average molecular weight less than 5000 containing pendant epoxide functional groups, and a curing agent which is reactive with the epoxide groups of the acrylic polymer, at ambient temperature the polymer being dissolved in an organic compound of viscosity less than 2 Pas (20 poise) at 25° C. containing at least one epoxide functional group.

11. A curable acrylic polymer composition according to claim 10, wherein the acrylic polymer contains pendant epoxide functional groups and the said organic compound is a cyclic compound substituted by at least two glycidyl groups.

12. A curable acrylic polymer composition according to claim 11, wherein the said organic compound is selected from cyclohexanedimethanol diglycidyl ether, diglycidyl phthalate, diglycidyl cyclohexanedicarboxylate and resorcinol diglycidyl ester.

13. A curable acrylic polymer composition according to claim 11, wherein the curing agent is a liquid polythiol of viscosity less than 2 Pas (20 poise) at 25° C.

14. A curable acrylic polymer composition according to claim 10, wherein the composition is a coating composition which is substantially free of non-reactive volatile solvent and has a viscosity of 0.1 to 2 Pas (1 to 20 poise) at 25° C.

15. A curable acrylic polymer composition comprising an acrylic polymer of number average molecular weight less than 5000 containing pendant functional groups selected from isocyanate groups, alkoxysilane groups, and activated —CH— groups bonded to at least two electron-withdrawing groups, wherein the activated —CH— groups are selected from the group consisting of: a functional acrylic group, an acetoacetate group, a malonate ester group, a 1,3-diketone and a cyanoacetate group and a curing agent which is reactive with the functional groups of the acrylic polymer, characterised in that the polymer is dissolved in an organic compound of viscosity less than 2 Pas (20 poise) at 25° C. containing at least one functional group of the same functionality as that present in the acrylic polymer, the functional group being reactive with the curing agent.

16. A curable acrylic polymer composition according to claim 15, wherein the acrylic polymer has pendant acetoacetate groups and the said organic compound is an acetoacetate ester.

17. A curable acrylic polymer composition according to claim 16, wherein the curing agent is a polyacrylate ester of a polyol.

18. A curable acrylic polymer composition according to claim 15, wherein the composition is a coating composition which is substantially free of non-reactive volatile solvent and has a viscosity of 0.1 to 2 Ps (1 to 20 poise) at 25° C.

19. A curable acrylic polymer composition according to claim 15, wherein the acrylic polymer has pendant alkoxysilane groups and the organic compound of viscosity less than 2 Pas (20 poise) at 25° C. is an organosilane containing at least one alkoxy group attached to silicon.

20. A process according to claim 3, wherein the functional monomer is an ethylenically unsaturated alkoxysilane and the reactive diluent is an organosilane containing at least one alkoxy group attached to silicon.

21. A process according to claim 1, wherein at least one olefinically unsaturated comonomer is polymerized with said olefinically unsaturated monomer.

22. The curable addition polymer coating composition of claim 8 further comprising at least one olefinically unsaturated comonomer polymerized with said olefinically unsaturated monomer.

23. A process for coating a substrate according to claim 9 further comprising at least one olefinically unsaturated comonomer polymerized with said olefinically unsaturated monomer.

* * * * *

UNITED STATES PATENT AND TRADEMARK OFFICE
CERTIFICATE OF CORRECTION

PATENT NO. : 6,433,097 B1
DATED : August 13, 2002
INVENTOR(S) : Steven Alistair Nixon It is certified that error appears in the above-identified patent and that said Letters Patent is hereby corrected as shown below:

<u>Title page,</u>
Item [56], References Cited, after "4,134,864 A * 1/1979 Belanger", replace "260/17 EP" with -- 260/18 EP --.

<u>Column 7,</u>
Line 37, after "3,4 -Epoxycyclohexylmethyl" delete "50".
Line 38, after "3,4 -Epoxcyclohexane carboxylate" insert -- 50 --.

<u>Column 10,</u>
Line 46, replace "Pa.s" with -- Pas --.

<u>Column 11,</u>
Line 3, replace "Pa.s" with -- Pas --.

<u>Column 12,</u>
Line 43, replace "Ps" with -- Pas --.

Signed and Sealed this

Twenty-fifth Day of February, 2003

JAMES E. ROGAN
*Director of the United States Patent and Trademark Office*